United States Patent
Uhl

(10) Patent No.: US 9,612,796 B2
(45) Date of Patent: Apr. 4, 2017

(54) METHOD AND DEVICE FOR CHECKING A DIGITAL MULTIPLIER

(71) Applicant: Robert Bosch GmbH, Stuttgart (DE)

(72) Inventor: Alexander Uhl, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 258 days.

(21) Appl. No.: 14/176,785

(22) Filed: Feb. 10, 2014

(65) Prior Publication Data

US 2015/0227341 A1    Aug. 13, 2015

(30) Foreign Application Priority Data

Feb. 8, 2013 (DE) ......................... 10 2013 202 140

(51) Int. Cl.
| | | |
|---|---|---|
| G06F 7/487 | (2006.01) | |
| G06F 7/523 | (2006.01) | |
| G06F 11/00 | (2006.01) | |
| G06F 5/01 | (2006.01) | |
| G06F 11/07 | (2006.01) | |

(52) U.S. Cl.
CPC ............ *G06F 5/012* (2013.01); *G06F 7/4876* (2013.01); *G06F 11/00* (2013.01); *G06F 11/0721* (2013.01); *G06F 11/0751* (2013.01); *G06F 7/523* (2013.01); *G06F 7/5235* (2013.01)

(58) Field of Classification Search
CPC ............................... G06F 7/4876; G06F 7/523
USPC ........................................................ 708/530
See application file for complete search history.

(56) References Cited

U.S. PATENT DOCUMENTS

| | | | | |
|---|---|---|---|---|
| 4,523,210 A * | 6/1985 | Kregness | ................ | G06F 11/10 708/531 |
| 5,253,195 A * | 10/1993 | Broker | ................... | G06F 7/509 708/530 |
| 7,769,795 B1 * | 8/2010 | Iacobovici | .............. | G06F 11/10 708/233 |
| 8,352,530 B2 * | 1/2013 | Dao | ....................... | G06F 11/08 708/209 |

* cited by examiner

*Primary Examiner* — Chuong D Ngo
(74) *Attorney, Agent, or Firm* — Gerard Messina

(57) ABSTRACT

A method for calculating an error signal that enables a diagnosis of the correctness of a product, determined by a first multiplier unit, of a first factor and a second factor, the error signal being determined by a difference formation unit as the difference of a sum logarithm and a product logarithm.

12 Claims, 2 Drawing Sheets

METHOD AND DEVICE FOR CHECKING A DIGITAL MULTIPLIER

CROSS REFERENCE

The present application claims the benefit under 35 U.S.C. §119 of German Patent Application No. DE 10 2013 202 140.2 filed on Feb. 8, 2013, which is expressly incorporated herein by reference in its entirety.

BACKGROUND INFORMATION

Due to the increasing miniaturization of ASIC structures, and decreasing operating voltages, transient errors in digital electronics represent an increasing challenge. For use in safety-critical systems, both transient errors and permanent errors must be recognized. Digital multipliers or squaring devices are a part of many electronic circuits and must therefore be monitored for both types of error.

In order to secure multipliers or squaring units, several methods are possible. One possible design is based on redundancy: the multiplication operation is carried out multiple times (either in temporal succession or in parallel on a plurality of multiplier units), and the results are compared to one another. The hardware and time outlay in this method is correspondingly very high.

A further possible design makes use of parity checking, or parity prediction. On the basis of the parities of the two operands of the multiplication, a prediction is made about the parity of the result. A disadvantage of this method is that individual errors that have multiple effects in the result word are not always detectable.

Another possible design makes use of residue code checking: similar to the approach based on parity prediction, on the basis of a property of the two operands (the residuum), a prediction is made about the residuum of the result. The residuum is the whole number remainder that results when one number is divided in whole-number fashion by another number (the so-called modulus).

In addition, further methods are possible, such as the use of Berger codes, two-rail encoding, or three-rail encoding, which can be used for monitoring.

SUMMARY

A further method is based on the principle of logarithmic checking. Here, the computing rule for logarithms is used (in the following, log 2 refers to the logarithm to the base 2, also known as logarithmus dualis):

$$\log 2(x \cdot y) = \log 2(x) + \log 2(y) \quad (1)$$

In order to secure the result of a multiplier, the difference of the left and right side of equation (1) is formed. In the case of error-free multiplication, and in the case of the exact calculation of the log 2 functional values, this difference is equal to 0. Because approximation methods are used for the calculation of the log 2 functional values in practice, the difference is however not exactly 0, but rather moves in the region around 0. For the securing of the multiplier, this means that false results are not recognized until they exceed or fall below a particular percent range relative to the correct result. This range is a function of the precision of the approximation methods.

The calculation of the log 2 functional values can be realized for example by the Mitchell approximation. For real input values in the interval [1, 2), open at the right, the Mitchell approximation gives an approximation for log 2:

$$\log 2(1+f) \approx f \text{ with } 0 \leq f < 1. \quad (2)$$

Because every number $T \geq 1$ can be expressed as the product of a square and a real number in the interval [1, 2), here as well the Mitchell approximation can be used for the calculation of log 2(T):

$$\log 2(T) = \log 2(2^k \cdot (1+f)) = \log 2(2^k) + \log 2(1+f) \quad (3)$$
$$= k + \log 2(1+f) \approx k + f$$

There are efficient digital circuits that use the Mitchell approximation presented above for the calculation of log 2 functional values of unsigned numbers.

On the basis of this security design (which also holds analogously for logarithms to a different base), in a first aspect of the present invention a method is provided for calculating an error signal that enables a diagnosis of the correctness of a product, determined by a first multiplier, of a first factor and a second factor. That is, using this error signal determined according to the present invention it is possible to diagnose whether the multiplication of the first multiplier was correct or had an error. Here, correctness of the multiplication means that the result of the multiplication lies within specified percentual limits around the true multiplication value.

According to the present invention, it is provided that the error signal is determined, using a difference formation unit, as the difference of a sum logarithm and a product logarithm. Here, the product logarithm is determined by a first logarithm formation unit as a logarithm of the absolute value of the product determined by the first multiplier.

In addition, it is provided that the sum logarithm is determined by a summation unit as the sum of a first exponent and a second exponent and a mantissa logarithm. The mantissa logarithm is determined by a second logarithm formation unit as a logarithm of the absolute value of a mantissa product, the mantissa product being determined by a second multiplier as the product of a first approximated normalized mantissa and a second approximated normalized mantissa.

The first approximated normalized mantissa is determined, using a first normalizing unit, as an approximation of the normalized mantissa of the floating-point representation of the first factor to a base b, the first exponent being the exponent belonging to this base b in this floating-point representation of the first factor. That is, the first exponent and the normalized mantissa are determined in such a way that, except for the sign, they yield the floating-point representation of the first factor to the base b. Here, the normalized mantissa is advantageously selected in such a way that:

1 ≤ normalized mantissa < b.

Analogously, the second normalized mantissa is determined, using a second normalizing unit, as an approximation of the normalized mantissa of the floating-point representation of the second factor to the base b, the second exponent being the exponent belonging to this base b in this floating-point representation of the second factor.

If the error signal is determined using this example method, this then has the particular advantage that even small percentual errors in the multiplication result can be recognized.

In a particularly advantageous further aspect, the first approximated normalized mantissa is determined as the approximation, limited to a first specifiable word width, of the normalized mantissa of the floating-point representation of the first factor. That is, the approximation provides a limitation of the precision of the normalized mantissa. This makes the example method particularly efficient.

In a particularly advantageous further aspect, the second approximated normalized mantissa is determined analogously as the approximation, limited to a second specifiable word width, of the normalized mantissa of the floating-point representation of the second factor, which also increases the efficiency of the example method. These two measures can also be combined.

In a particularly advantageous development, it is provided that the first specifiable word width is less than the word width of the first factor. This further brings about particular efficiency of the example method.

Analogously, and with the same advantages, it can be provided that the second specifiable word width is less than the word width of the second factor.

In a particularly advantageous development, it can be provided that the first specifiable word width is equal to the second specifiable word width. This results in a particularly precise representation for a given size of the second multiplier unit.

In a further particularly advantageous aspect, the product logarithm is determined as the logarithm to the base 2 of the absolute value of the result of the first multiplier unit, i.e., of the product of the first factor and the second factor, the mantissa logarithm is determined as the logarithm to the base 2 of the absolute value of the mantissa product, and the base b of the floating-point representation of the first and of the second factor is chosen to be 2. In this way, the example method is made particularly efficient, because for example the multiplications using the base b, or divisions by the base b, required to determine the mantissa values can be implemented particularly simply using bit-shift operations.

In a further particularly advantageous aspect, it is provided that the second logarithm formation unit determines the mantissa logarithm using the conventional Mitchell approximation, which presents a particularly efficient approximation method for calculating the logarithm to the base 2.

Analogously, in a further particularly advantageous aspect, it can be provided that the first logarithm formation unit determines the product logarithm using the Mitchell approximation.

In a further particularly advantageous aspect of the present invention, an example method is provided for determining an error of the first multiplier unit, in which, as a function of the error signal determined, a decision unit is used to determine whether the product of the first and second factor determined by the first multiplier unit is correct.

Here, in a particularly simple way it can be decided that the product is not correct if the error signal is smaller than a specifiable lower threshold value, or if the error signal is greater than a specifiable upper threshold value.

As described above, the example method according to the present invention still leaves out of consideration the sign of the first factor, or of the second factor. In a particularly advantageous development, it can be provided that a first sign of the first factor is determined and a second sign of the second factor is determined, and that a third sign of the product determined by the first multiplier unit is determined, and that it is decided that the product is incorrect if the product of the first sign and the second sign does not correspond to the third sign. In this way, the method according to the present invention can also check the sign supplied by the first multiplier unit for correctness.

Such a multiplication of the first sign and the second sign can be realized particularly efficiently by a XOR gating of the first sign and the second sign.

In a further particularly advantageous specific embodiment, devices are provided that can carry out the method according to the present invention.

In a first specific embodiment, an example device is provided for carrying out all steps of one of the example methods for determining the error signal. Such a device advantageously includes the first normalizing unit, the second normalizing unit, the second multiplier unit, the first logarithm formation unit, the second logarithm formation unit, the difference formation unit, and the summation unit.

In a particularly advantageous development, such an example device also includes the first multiplier unit, and thus represents a multiplier unit that can be diagnosed particularly well.

In a further advantageous aspect of the present invention, a diagnostic device is provided for carrying out one of the named methods for the diagnosis of the first multiplier unit. This diagnostic unit advantageously includes the first normalizing unit, the second normalizing unit, the second multiplier unit, the first logarithm formation unit, the second logarithm formation unit, the decision unit, the difference formation unit, and the summation unit.

In a further advantageous development, such an example device also includes the first multiplier unit, and thus represents a multiplier unit that can itself diagnose errors.

These devices can be realized as software, or also as hardware circuits, or as a mixed realization of software and hardware.

BRIEF DESCRIPTION OF THE DRAWINGS

The figures show particularly advantageous specific embodiments of the present invention.

DETAILED DESCRIPTION OF EXAMPLE EMBODIMENTS

Figure 1:
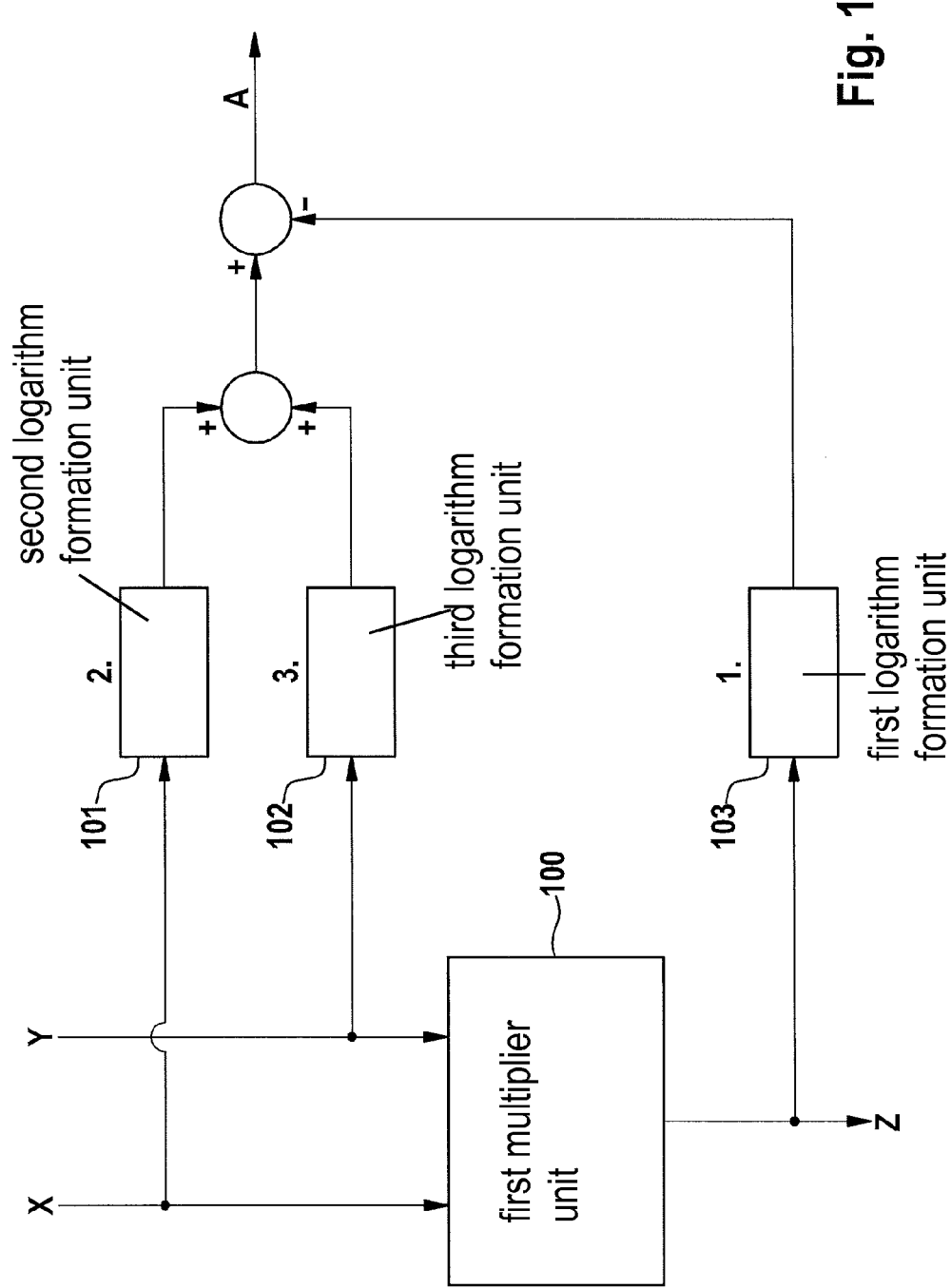
FIG. 1 shows a configuration illustrating how equation (1) can be used for monitoring.

A configuration that uses equation (1) for monitoring is shown in FIG. 1. Shown is first multiplier unit 100, a first logarithm formation unit 103, a second logarithm formation unit 101, and a third logarithm formation unit 102. First factor X is supplied to second logarithm formation unit 101 and to a first input of first multiplier unit 100, and second factor Y is supplied to third logarithm formation unit 102 and to a second input of first multiplier unit 100. First multiplier unit presents at its output the product Z=X·Y of the values present at its two inputs. This product Z is supplied to first logarithm formation unit 103.

The outputs of second logarithm formation unit 101 and third logarithm formation unit 102 are added, and from them is subtracted the output of first logarithm formation unit 103, thus yielding an output signal A.

In the error-free case, and if the logarithms can be calculated approximately precisely, output signal A is approximately equal to 0. Because the approximately precise calculation of the logarithm either requires a very large hardware outlay or else takes place iteratively, which is not desirable in this case of application, low-cost approximations such as the Mitchell approximation are normally used for the calculation.

Through the approximations, in the calculation of the outputs of second logarithm formation unit 101, third logarithm formation unit 102, and first logarithm formation unit 103, in each case an error is made. Due to these errors, output signal A can be unequal to zero even in the error-free case.

Output signal A thus moves, in the error-free case, within particular known limits that are a function of the approximation method. The closer these limits are to one another, the smaller the percentual errors that can be detected in product Z are. A disadvantage of the securing method is that the logarithms, calculated by approximation methods, of first factor X and second factor Y are added. Because an error is made in each of the two logarithm calculations, these errors are thus summed. These errors have the result that the range of values within which output signal A moves in the error-free case is relatively large. Because the size of the value range determines the minimum percentual deviation of the result from which an error can be detected, in this way the error recognition becomes possible only starting from larger percentual deviations.

Figure 2:
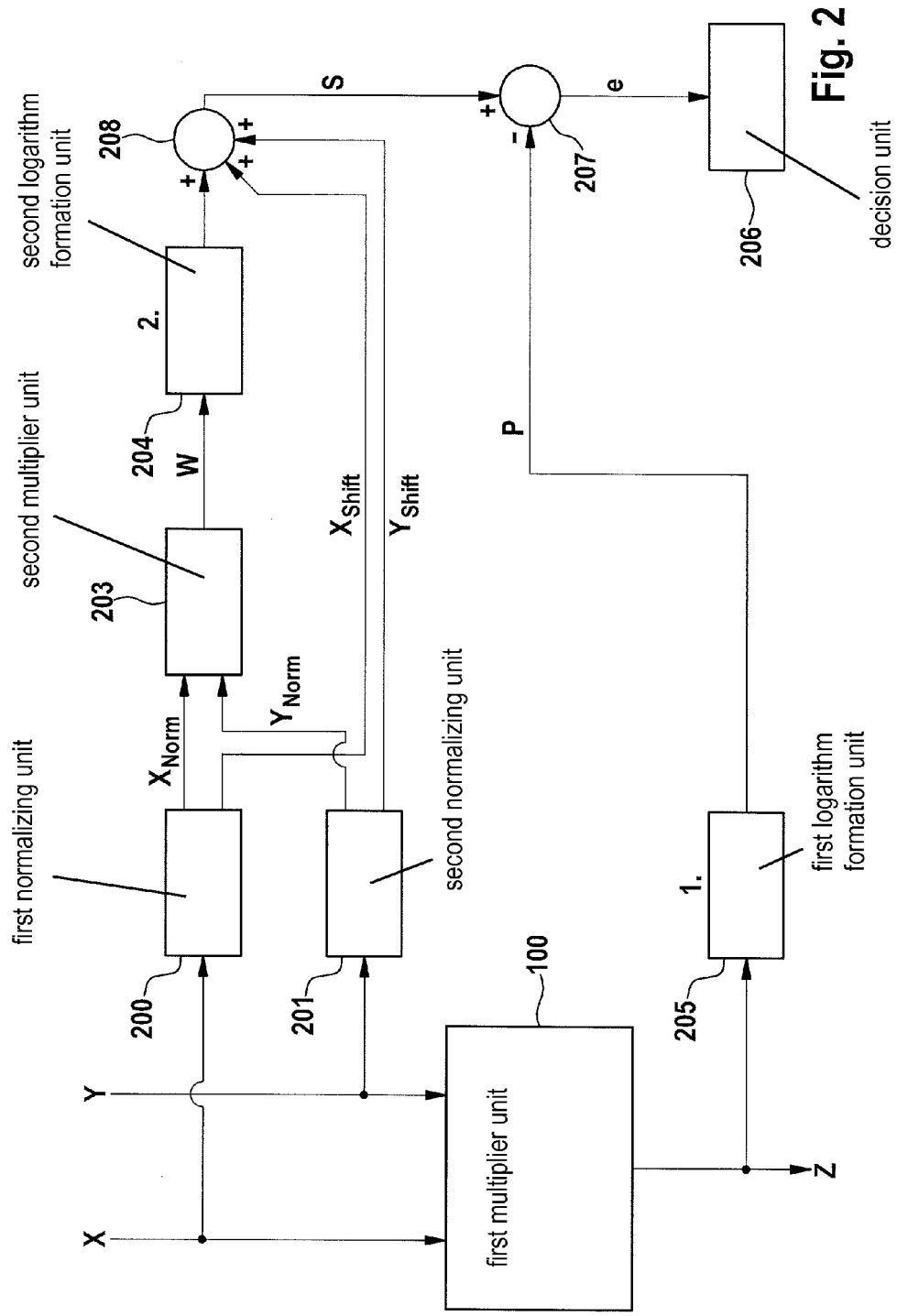
FIG. 2 shows a configuration illustrating an example method according to the present invention.

FIG. 2 shows a schematic diagram providing better recognition of all errors that falsify the result past known limits (related to the result as a percentage).

Again, first multiplier unit 100 is shown, which is for example a digital multiplier unit, to whose inputs are supplied first factor X and second factor Y, and at whose output the product Z=X·Y is outputted.

In the following, the securing of an unsigned multiplier having N-bit input word width is considered. However, this is not a limitation, because in the case of a signed multiplier for example the first factor X, second factor Y, and product Z can be made positive through absolute value formation, and consequently the securing method can then also be applied. The correctness of the signs can however advantageously be additionally checked in this case.

Likewise, the word width of first factor X and the word width of second factor Y need not be equally large. For example, the word width of the first factor can be 16 bits, and the word width of the second factor can be 8 bits.

In the following, the procedure is described relative to the base 2 throughout. However, for someone skilled in the art it is completely clear how the described procedure can be transferred to any other base, for example 4 or 10.

The present invention is based on the recognition that every unsigned number K can be expressed as the product of two numbers through the factoring out of the closest square less than or equal to K. Here, one of the factors is the square, and the other is a decimal number in the interval [1 ... 2); i.e., 1≤decimal number≤2. The decimal number is also referred to as the normalized mantissa. Let the square be designated $2^{Kshift}$ and the decimal number, i.e., the normalized value, $K_{NormExakt}$. Technically, this normalized representation of the number can for example be found by dividing input word K successively by 2 until the result moves in the interval [1 ... 2). $K_{Shift}$ then indicates the number of divisions by 2 necessary for the normalizing. The division of a number, or of a word, by 2 can be realized for example through a right-shift operation of the word. The relationship between the N-bit unsigned number K and the normalized representation is shown in equation (4).

$$K = [k_{N-1} \ldots k_1 k_0] = k_{N-1} \cdot 2^{N-1} + \ldots + k_1 \cdot 2^1 + k_0 = 2^{KSDT} \cdot K_{NormExakt} \quad (4)$$

where $1 \leq K_{NormExakt} < 2$

The normalized value $K_{NormExakt}$ can have a maximum of N-1 positions after the decimal point. This value can be approximated by truncating the lower-value figures after the decimal point, corresponding to a rounding off. The result of the rounding off of $K_{NormExakt}$ by truncation after the (m-1)th position after the decimal point is designated $K_{Norm}$, and, in comparison with $K_{NormExakt}$, has a smaller word width, namely m bits (see equation (5)).

$$K_{NormExakt} = [\underbrace{1 \ldots k_{-1}k_{-2}k_{-3} \ldots k_{-(N-1)}}_{N-1}] = 1 \cdot 2^0 + k_{-1} \cdot 2^{-1} + \ldots + \quad (5)$$

$$k_{-(N-1)} \cdot 2^{-(N-1)}$$

$$\approx K_{Norm} = [\underbrace{1 \ldots k_{-1} \ldots k_{-(m-1)}}_{m-1}] = 1 \cdot 2^0 + k_{-1} \cdot 2^{-1} + \ldots +$$

$$k_{-(m-1)} \cdot 2^{-(m-1)}$$

The decimal place m-1 after which truncation takes place determines the word width, which in the following is also referred to as specifiable word width m.

As is further shown in FIG. 2, first factor X is supplied to first normalizing unit 200, and second factor Y is supplied to second normalizing unit 201.

First normalizing unit 200, or second normalizing unit 201, realize the normalizing for the first factor X or second factor Y in the manner presented above. First normalizing unit 200 has the first approximated normalized mantissa (normalized, approximated representation) XNorm, and the number of right-shift operations XShift (divisions by base 2) required for the normalizing, i.e., the first exponent, as output. Analogously, second normalizing unit 201 has the second approximated normalized mantissa (normalized, rounded-off representation) YNorm and the number of right-shift operations YShift (divisions by base 2) required for the normalizing, i.e., the second exponent, as output.

First normalizing unit 200 and second normalizing unit 201 need not necessarily limit first approximated normalized mantissa XNorm or second approximated normalized mantissa YNorm to the same specifiable word width m. It is also possible for first normalizing unit 200 to limit first approximated normalized mantissa XNorm to a first specifiable word width m1 and for second normalizing unit 201 to limit second approximated normalized mantissa YNorm to a second specifiable word width m2.

First approximated normalized mantissa XNorm and second approximated normalized mantissa YNorm are supplied to second multiplier unit 203. In comparison with first multiplier unit 100 that is to be checked, this second multiplier unit has for example a smaller word width of m·m bits, or m1·m2 bits. The result of this multiplication, mantissa product W, represents, together with first exponent XShift and second exponent YShift, an approximation of expected product Z of first multiplier unit 100; i.e., the following relation holds:

$$W \cdot 2^{XSMD} \cdot 2^{YSMD} \approx Z \quad (6)$$

The comparison as to whether the result to be checked is in the expected range takes place via the comparison of the logarithms to the base 2 (log 2) of $W \cdot 2^{XShift} \cdot 2^{YShift}$ and of the product Z. The difference in the logarithms provides information about the percent deviation of the result that is to be checked from the expected result. This difference is designated error signal e (see equation (7)).

$$e = \log2(W \cdot 2^{X_{Shift}} \cdot 2^{Y_{Shift}}) - \log2(Z) = \log2\left(\frac{W \cdot 2^{X_{Shift}} \cdot 2^{Y_{Shift}}}{Z}\right) \quad (7)$$

$$= X_{Shift} + Y_{Shift} + \log2\left(\frac{W}{2}\right) = X_{Shift} + Y_{Shift} + \log2(W) - \log2(Z)$$

As is shown in FIG. 2, mantissa product W is therefore supplied to second logarithm formation unit 204, which determines therefrom its logarithm, mantissa logarithm L. Represented in a manner corresponding to the last expression of the right side of the equation (7), mantissa logarithm L, first exponent XShift, and second exponent YShift are supplied to summation unit 208, which determines the sum of these three terms, sum logarithm S, and supplies it to the positive input of difference formation unit 207. Product Z is supplied to a first logarithm formation unit 205, which determines therefrom its logarithm, product logarithm P, and supplies it to the negative input of difference formation unit 207.

Difference formation unit 207 determines the difference of sum logarithm S and product logarithm P to form error signal e according to equation (7). This error signal e is supplied to diagnostic unit 206.

First logarithm formation unit 205 and/or second logarithm formation unit 204 advantageously use low-cost approximation methods to calculate the logarithm to the base 2, such as the Mitchell approximation.

For the case in which no error is present in first multiplier unit 100, error signal e then moves in the range between two known boundary values. This upper or lower boundary value is a function of the approximation method or methods used to calculate the logarithm, and of the specifiable word width m, or of word widths m1 and m2, used in the normalizing of first approximated normalized mantissa XNorm or second approximated normalized mantissa YNorm.

The checking of whether error signal e moves in this range provides information as to whether the result of the multiplier to be checked is false, or is regarded as correct. Decision unit 206 realizes this test by comparing error signal e with the specifiable lower threshold value, corresponding to the lower bound, or to the specifiable upper threshold value, corresponding to the upper bound, and an error is inferred if error signal e is below the lower specifiable threshold value or is above the upper specifiable threshold value.

What is claimed is:

1. A method for determining an error in a first multiplier unit of an ASIC circuit of a safety critical system, the method comprising:
    determining, via the first multiplier unit, a product of a first factor and a second factor;
    determining, via a first logarithm formation unit, a product logarithm as a logarithm of an absolute value of the product from the first multiplier unit;
    determining, via a summation unit, a sum logarithm from a sum of a first exponent and a second exponent and a mantissa logarithm; and
    determining, via a difference formation unit, the error as a difference of the sum logarithm and the product logarithm;
    wherein the mantissa logarithm is determined by a second logarithm formation unit as a logarithm of an absolute value of a mantissa product, the mantissa product being determined by a second multiplier unit as a product of a first approximated normalized mantissa and a second approximated normalized mantissa, the first approximated normalized mantissa being determined by a first normalizing unit as an approximation of a normalized mantissa of the floating-point representation of the first factor to a base, the first exponent being the exponent belonging to the base in a floating-point representation of the first factor; and
    wherein the second approximated normalized mantissa is determined by a second normalizing unit as an approximated normalized mantissa of a floating-point representation of the second factor to the base, the second exponent being the exponent belonging to the base in the floating-point representation of the second factor,
    wherein the product is recognized as false if the error exceeds or falls below a percent range relative to a correct product, and
    wherein the error is in the first multiplier unit of the ASIC circuit of the safety critical system.

2. The method as recited in claim 1, wherein the first approximated normalized mantissa is the approximation, limited to a first specifiable word width, of the normalized mantissa of the floating-point representation of the first factor.

3. The method as recited in claim 2, wherein the first specifiable word width is smaller than a word width of the first factor.

4. The method as recited in claim 1, wherein the second approximated normalized mantissa is the approximation, limited to a second specifiable word width, of the normalized mantissa of the floating-point representation of the second factor.

5. The method as recited in claim 4, wherein the second specifiable word width is smaller than a word width of the second factor.

6. The method as recited in claim 4, wherein the first specifiable word width is equal to the second specifiable word width.

7. The method as recited in claim 1, wherein the product logarithm is determined as a logarithm to base 2 of the absolute value of the product, and the mantissa logarithm is determined as the logarithm to the base 2 of the absolute value of the mantissa product, and the base of the floating-point representation of the first factor and of the second factor is selected to be 2.

8. The method as recited in claim 1, wherein the second logarithm formation unit determines the mantissa logarithm using Mitchell approximation.

9. The method as recited in claim 1, wherein the first logarithm formation unit determines the product logarithm using Mitchell approximation.

10. The method as recited in claim 1, wherein the product is not correct if one of: i) if the error is smaller than a known specifiable lower threshold value, or ii) if the error is greater than a known specifiable upper threshold value.

11. The method as recited in claim 1, wherein a first sign of the first factor is determined, and a second sign of the second factor is determined, and a third sign of the product is determined, and wherein it is determined that the product is not correct if the product of the first sign and the second sign does not correspond to the third sign.

12. A device to determine an error in a first multiplier unit of an ASIC circuit of a safety critical system, comprising:
    a hardware circuit including or a processor having a program for implementing the following:
        a first normalizing unit;
        a second normalizing unit;
        a second multiplier unit;
        a first logarithm formation unit;

a second logarithm formation unit;
a difference formation unit; and
a summation unit;
wherein the hardware circuit or the processor is configured to perform the following:
  determining, via the first multiplier unit, a product of a first factor and a second factor;
  determining, via the first logarithm formation unit, a product logarithm as a logarithm of an absolute value of the product from the first multiplier unit;
  determining, via the summation unit, a sum logarithm from a sum of a first exponent and a second exponent and a mantissa logarithm; and
  determining, via the difference formation unit, the error as a difference of the sum logarithm and the product logarithm;
wherein the mantissa logarithm is determined by the second logarithm formation unit as a logarithm of an absolute value of a mantissa product, the mantissa product being determined by a second multiplier unit as a product of a first approximated normalized mantissa and a second approximated normalized mantissa, the first approximated normalized mantissa being determined by the first normalizing unit as an approximation of a normalized mantissa of the floating-point representation of the first factor to a base, the first exponent being the exponent belonging to the base in a floating-point representation of the first factor;
wherein the second approximated normalized mantissa is determined by the second normalizing unit as an approximated normalized mantissa of the floating-point representation of the second factor to the base, the second exponent being the exponent belonging to the base in a floating-point representation of the second factor, and
wherein the product is recognized as false if it exceeds or falls below a percent range relative to a correct product, and
wherein the error is in the first multiplier unit of the ASIC circuit of the safety critical system.

* * * * *